(No Model.)
M. L. HANSEN.
ELECTRIC METER.
No. 416,604. Patented Dec. 3, 1889.
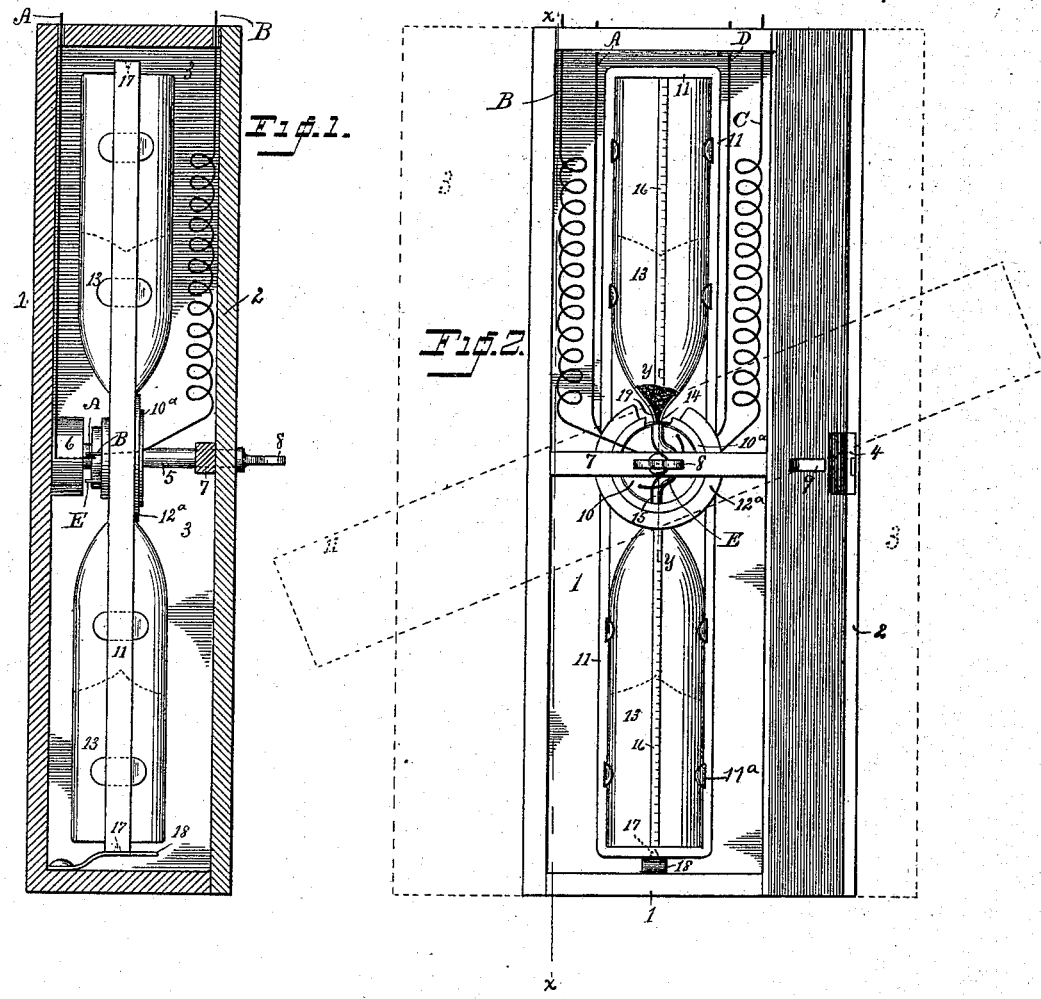
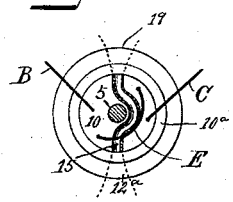
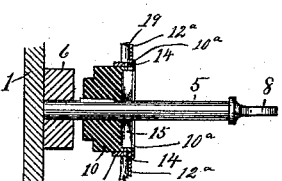
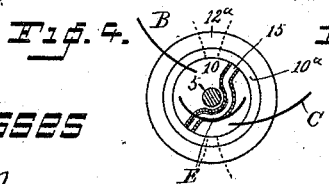
Witnesses
C. M. Newman,
Etta J. Pettit
Inventor
Mads L. Hansen
By H. M. Wooster
Atty.

UNITED STATES PATENT OFFICE.

MADS L. HANSEN, OF BRIDGEPORT, CONNECTICUT, ASSIGNOR OF ONE-HALF TO FRANK ARMSTRONG, OF SAME PLACE.

ELECTRIC METER.

SPECIFICATION forming part of Letters Patent No. 416,604, dated December 3, 1889.

Application filed April 23, 1889. Serial No. 308,267. (No model.)

*To all whom it may concern:*

Be it known that I, MADS L. HANSEN, a subject of the King of Denmark, residing at Bridgeport, in the county of Fairfield and State of Connecticut, have invented certain new and useful Improvements in Instruments for Registering the Time an Electric Current is Used; and I do hereby declare the following to be a full, clear, and exact description of the invention, such as will enable others skilled in the art to which it appertains to make and use the same.

My invention has for its object to devise an instrument or meter for registering the time that an electric current is used, the instrument being applicable in all the various places and to all of the various uses to which an electric current may be applied—as, for instance, in supplying power to an electric motor or in running an electric-lighting system, either arc or incandescent—the principle being that the instrument shall not be affected in the slightest by the intensity of the current or by the amount of the current that may be used, but that it will record with accuracy the amount of time that any current is used.

With this end in view I have devised the simple and novel meter of which the following description, in connection with the accompanying drawings, is a specification, numbers being used to denote the several parts.

Figure 1 is a vertical section through the case of my novel meter, the line thereof being indicated by $x\ x$ in Fig. 2, and the operative parts being in elevation; Fig. 2, a front elevation of the device complete, the front door being shown as in the open position, and the position of the side doors when in the open position being indicated by dotted lines; Fig. 3, a face view of the central hub, the shaft and tube being in section, showing the parts in operative position—that is to say, at a time when the current is passing from the meter to the field-circuit, and the amount of time that the current is passing to the field-circuit is being registered by the meter; Fig. 4, a similar view showing the position of the parts when the current is short-circuited—that is, not passing from the meter to the field-circuit; Fig. 5, a back view of the hub in the position shown in Fig. 3; Fig. 6, a section on the line $y\ y$ in Fig. 2; and Fig. 7 is an elevation of the block in which the receiving and outgoing wires are held.

1 denotes the case of the meter, which may be made of any preferred material, ordinarily wood, and of any suitable construction. The front of the case is closed by a door 2 and the sides by doors 3. The side doors are fastened in the locked position by suitable hooks or bolts (not shown) and the front door is held at the closed position by a lock 4.

A denotes the receiving-wire; B, the distributing-wire; C, the incoming wire; D, the outgoing wire, and E the short-circuit wire.

5 denotes a shaft, which is journaled in a block 6 at the back of the case and in a cross-piece 7 at the front of the case. The end of said shaft projects outward from the front of the case, and is provided with a finger-piece 8, for convenience in operation. The front door is provided with an opening 9, through which the end of the shaft passes when the door is moved to the closed position. This is in order that the shaft may be operated without opening the door. The receiving and outgoing wires pass into the case from any suitable direction, and into the block 6, where they are firmly held, the ends thereof projecting outward slightly from the block, one of said ends being clearly shown in Fig. 1. (See also Fig. 7.)

10 denotes a hub, which is firmly secured to the shaft, ordinarily by a key (see Fig. 6) and turns with it. This hub is either made of insulating material—for example, hard rubber—or else the contact portions of it are thoroughly insulated. The ends of the short-circuit wire project backward from this hub in suitable position to engage the receiving and outgoing wires simultaneously. This short-circuit wire may be embedded in the hub or may be carried through it, passed across the front, and then through to the back again, as indicated in the drawings, this being simply a matter of convenience in manufacturing.

11 denotes a frame having a collar 12, which is mounted on the hub so that it may be turned thereon. This collar is preferably provided with a flange 12ª, which engages a flange 10ª on hub 10. (See Figs. 2 and 6.) This, however, is not an essential feature of construction.

13 denotes receptacles carried by the frame, which may be of any suitable shape and size. These receptacles are placed one directly above the other, and are provided with narrow necks 19, pointing inward toward each other, the ends of which register with openings 14 in collar 12, one of said openings being at the top, the other at the bottom of said collar, when the parts are in the operative position.

15 denotes a tube carried by hub 10, the ends of which are adapted to register with openings 14 and the necks of the receptacles, as will presently be fully explained. The receptacles are shown as held in position upon the frame by clips 11ª. They are preferably made of glass, in order that the contents may be readily seen, although other material may be used, if preferred, a gage 16 being provided upon the front of each. The gage-marks may be made upon the receptacles themselves or upon independent strips attached thereto. At each end of the frame is a socket 17, which is engaged by a spring-latch 18 at the bottom of the case, so that the frame and the receptacles are held securely in operative position. In manufacturing, one of these receptacles is filled with any suitable material, preferably sand, although a fluid may be used, if preferred. The ends of the distributing and incoming wires pass into hub 10, and the ends project backward therefrom in position to engage the ends of the receiving and outgoing wires when required.

In Fig. 2 the device is shown as in operative position—that is to say, the current is passing from the receiving to the distributing wire and back through the incoming and outgoing wires to the source of supply, and the length of time that the current is employed is being registered by the meter. Suppose that it is desired to use the meter in connection with an incandescent electric-lighting system, the meter will act to record the exact amount of time that the current is in use. It will of course be understood that the size of the receptacle, the fineness of the sand, and the size of the necks may be so graduated that the meter will run a month, two months, three months, or any required length of time.

In manufacturing, after assembling the meter is thoroughly and accurately tested and graduated before being placed in use. When it is desired to use the lighting system, the operator simply has to turn hub 10, by means of finger-piece 8, until the parts are in the position shown in Figs. 1, 2, and 3—that is to say, until the filled receptacle is uppermost, in which position it is locked by spring-latch 18. This places the distributing-wire in contact with the receiving-wire and the incoming wire in contact with the outgoing wire, so that the current must pass through the field-circuit before returning to the dynamo or other source of supply. The entire system may or may not be self-lighting when the current is turned on. In practice separate thumb-pieces or push-buttons may be provided for each light. While the parts are in this position the ends of the tube register with openings 14 and the necks of the receptacles, so that the sand will pass through said openings and tube into the lower receptacle. When the current is not required for the lighting system or other purpose for which it may be used, the operator, by means of the finger-piece, simply turns the parts to the position shown in Fig. 4. This places the ends of the short-circuit wire in contact with the receiving and outgoing wires, so that the current, instead of passing beyond the meter and into the lighting system, is short-circuited back to the source of supply. It will be noticed that the instant the parts are moved to the short-circuit position, as in Fig. 4, the ends of the tube pass out of line with openings 14 in the collar, the smooth outer surface of the collar acting as a cut-off to instantly stop the flow of sand from the upper receptacle. It will thus be seen that the instant the current is cut off the instrument stops registering.

In use the state of the meter may be taken at regular intervals in the same manner that the state of gas-meters is taken, the only difference being that in using my novel meter the exact length of time that the current is used is accurately registered.

In taking the state of the meter when it is found that the sand has all or nearly all passed from one receptacle to the other the frame is released from spring-latch 18 and given a half-turn, placing the filled receptacle at the top, where it is locked by the spring-latch, as before, this operation being repeated as often as may be required. It will be understood that the position of the receptacles cannot be changed without unlocking all of the doors, the key to the meter being of course retained by the person supplying the current.

It will be noticed in Figs. 1 and 2 that I have indicated the sand-lines in both receptacles by dotted lines, each of the receptacles being about half-full. I have also in Fig. 2 broken away the neck of the upper receptacle, showing the sand within, and the upper portions of the flanges of the hub and collar, showing the engagement of the neck with the tube.

Having thus described my invention, I claim—

1. An instrument for registering the time that an electric current is used, consisting of a movable hub carrying the ends of distributing and incoming wires, a short-circuit wire, and a tube 15, a frame having a collar provided with openings 14, which is mounted on the hub, and receptacles carried by said frame and provided with necks 19, which register with the openings, so that when the tube is in line with the openings the sand in the upper receptacle will pass through the tube into the lower receptacle.

2. The combination, with receiving and outgoing wires and a movable hub carrying the ends of distributing and incoming wires, a short-circuit wire, and a tube 15, of a frame having a collar 12, journaled on said hub and having openings 14, and receptacles carried by said frame and having necks which register with said openings, the parts being so arranged that when the distributing and incoming wires are in contact with the receiving and outgoing wires the ends of the tube register with the necks of the receptacles, and when the ends of the short-circuit wire are in contact with the receiving and outgoing wires said tube is moved out of line with the necks of the receptacles and the flow of sand from the upper receptacle is cut off.

3. The combination, with receiving and outgoing wires, and a movable hub carrying a short-circuit wire, the ends of distributing and incoming wires, and a tube 15, of a frame having a collar journaled on said hub, and having openings 14, receptacles carried by said frame and having necks registering with said openings, and a spring-latch adapted to hold the frame in operative position.

4. The combination, with receiving and outgoing wires and a movable hub carrying a short-circuit wire, the ends of distributing and incoming wires, and a tube 15, of a frame having a collar journaled on said hub and provided with openings 14, adapted to register with the ends of the tube, receptacles carried by said frame and having necks registering with said openings, and gages upon said receptacles by which the quantity of material passing from one receptacle to the other is indicated, said parts being so arranged that when the distributing and incoming wires are in contact with the receiving and outgoing wires a constant flow of material takes place from the upper receptacle through the tube to the lower receptacle, and when the ends of the short-circuit wire are in contact with the receiving and outgoing wires the flow of material from the upper receptacle is cut off.

In testimony whereof I affix my signature in presence of two witnesses.

MADS L. HANSEN.

Witnesses:
   A. M. WOOSTER,
   ETTA F. PETTIT.